United States Patent Office 3,278,313
Patented Oct. 11, 1966

3,278,313
PROCESS FOR PRODUCING CHEDDAR TYPE CHEESE CONTAINING POLYUNSATURATED FAT
Kenneth H. Rhodes, Pinole, Calif., assignor to Pacific Vegetable Oil Corporation, San Francisco, Calif., a corporation of California
No Drawing. Filed Jan. 28, 1963, Ser. No. 254,466
4 Claims. (Cl. 99—116)

This invention relates to a cheddar type cheese containing polyunsaturated fat.

Cheddar cheese ordinarily is made from whole milk and therefore contains saturated fat, which is objectionable to the diet of some people. The present invention provides a cheddar cheese made from polyunsaturated fat, which these people can include in their diet, and it provides a method for overcoming the special problems that occur when such cheese is to be made, including the problem of assuring homogenization of the polyunsaturated fat in milk serum non-fat and the problem of assuring proper culture of the cheese-starting organisms, which tend to react unfavorably to the different environment they encounter and to be much less efficient than usual, unless given the treatment provided by this invention.

Other objects and advantages of the invention will appear from the following description of a preferred form of the invention.

The invention begins with making a substituted milk from skimmed milk solids (or skimmed milk) and polyunsaturated fat. As a typical example, a formula is given for the constituents other than the polyunsaturated fat as follows:

| Milk content: | Parts by weight, percent |
|---|---|
| Non-fat milk solids | 8.45 |
| Milk fat | 0.5 |
| Inherent citric acid | 0.9 |
| Mono- and di-glyceride emulsifier | 0.5 |
| Lecithin | 0.2 |
| Added citric acid | .13 |
| Antioxidant (e.g., BHT, BHA, and propyl gallate and citric acids) | 0.075 |
| Water | 86.6 |
|  | 97.355 |

The ingredients of the above tabular formula are added to a pasteurizing vat and heated slowly so as to reach 165° F. in about 10 minutes. Then 3.8 parts by weight of polyunsaturated fat, preferably in the form of safflower oil, are added to this heated mixture, and the pasteurizing process is continued for 30 minutes at about 175° F. The mixture is then homogenized at 500 p.s.i., cooled to 36° F., and stored for cure, preferably overnight, although it may be somewhat longer or somewhat shorter. The cure assures good taste, tempering, and stability.

After curing, the substituted milk is added to a cheese vat and heated to about 90° F., and a cheddar cheese starter is added at the rate of about 3% of the milk and stirred in thoroughly.

The starter presents one of the big problems of the invention, for if ordinary cheddar cheese starter is added, the desired results will not be forthcoming, or else they will come so slowly that there would be spoilage of the milk before the necessary reaction occurs. According to the present invention, however, I take the various microorganisms (usually Streptococcus with some Lactobacillus, such as a mixture of *Streptococcus lactis, Streptococcus cremoris, Leuconostoc dextranicum,* and *Leuconostoc citrovorum,* introduce the mixtures of organisms into a very small sample of the safflower milk, and culture this sample. The organism grows fairly slowly in this culture, but it does grow and as it grows it becomes somewhat accustomed to its new and different environment. Material from the culture is then taken and injected into another sample of safflower milk to make another culture, and this reculturing is continued until the organism is thoroughly accustomed to the environment of the safflower oil filled milk. It is then suitable for use to make starter that is to be injected into the commercially manufactured filled milk, the starter base also being a safflower oil milk.

If it is desired to have a product the color of normal cheddar cheese, the color is also added at this point. Any suitable approved coloring agent can be used.

To the mixture, rennet is then added at the rate of about 3 ounces per 1,000 pounds of the filled milk mixture. The rennet is well mixed in, and then the mixture is left quiet, to set. Setting takes about a half hour and is indicated when the curd breaks evenly from the sides of the vat.

After setting, the curd is cut, as by stainless steel wires about ¼ inch apart, into a series of ¼-inch cubes. These cubes stand 10 minutes to develop a film on the outside and then are put into the cooking process. Every 5 minutes, the temperature is raised 2° until 100° F. is reached, and the cooking is continued at 100° F. until a handful of curd in a closed fist will not mat together; then it is stopped. A typical cooking time for this product is about 1¾ hours. Then the substance is strained of whey, which at this time will have a titratable acidity of about 0.30%.

After draining, the curd stands until it knits together sufficiently so that it can easily be lifted off the bottom of the vat. This happens in about 25 or 30 minutes after draining. The matted curd is then cut into sections of about 1 inch by 2 inches by 1 foot and submitted to the normal cheddaring process, being turned and stacked alternately, until the titratable acidity of the whey reaches a value of about 0.65%. This takes about 2 hours, quite a while longer than it takes on regular cheddar cheese. Then the curd is milled, and, after milling, is salted at the rate of 2.5% by weight of the original safflower-filled milk.

After salting, the curd is put up in hoops according to conventional cheddar-cheese-making practice, and is pressed for about one hour in a cheese press. Then heavy linen bandages that retain the moisture and keep the air away from the cheese are put on and the cheese is kept pressed for about 26 hours. After that, the bandages are removed, and the hoop-shaped loaves are cut into bricks of about 2½ and 5 pounds each, and these bricks are dressed with cheese cloth, held to get a slight scab, and then returned to the press for 2 hours. Afterwards, they are stored at 40° F. in a cold room for about two days and are then dipped in paraffin, which is at about 230° F. to put on a wax coating. The cheese is then cured, at least 60 days, the exact number of days depending on how sharp a cheese is desired.

I claim:
1. A process for making a cheddar cheese product without saturated fats, comprising the steps of
    (a) making a substituted milk containing skim milk solids and polyunsaturated fats, in about the same proportions as in whole milk, with added citric acid in an amount of about one-eighth of one percent by weight of the substituted milk,
    (b) adding thereto starter microorganisms that have been grown by first injecting cheddar cheese starter microorganisms into a first batch of substituted milk substantially identical to that of (a) and culturing it there, injecting the resulting growth of microorga- nism into another batch of substituted milk substantially identical to the first, culturing it, and continuing said injection and culture until a microorganism accustomed to the environment of (a) is obtained, (c) adding rennet, and (d) then completing the process as for cheddar cheese.

2. The process of claim 1 wherein the polyunsaturated fat is safflower oil.

3. A process for making a cheddar cheese product without saturated fats, comprising the steps of (a) culturing a cheddar cheese starter in a first batch of substituted milk containing skim milk solids and polyunsaturated fat, in about the same proportions as in whole milk, with added citric acid in the amount of about one-eighth of one percent by weight of said substituted milk, (b) culturing the resultant microorganism in a second batch of said substituted milk, (c) culturing the microorganism resulting from (b) in a third batch of said substituted milk and continuing successive culture until an adapted microorganism is obtained which is thoroughly accustomed to the environment of said substituted milk, (d) adding said adapted microorganism to another batch of said substituted milk, (e) adding rennet and (f) then completing the process as for cheddar cheese.

4. The process of claim 3 wherein the polyunsaturated fat is safflower oil.

References Cited by the Examiner

UNITED STATES PATENTS

| | | | |
|---|---|---|---|
| 136,051 | 2/1873 | Freeman | 99—116 |
| 241,788 | 5/1881 | Cooley | 99—116 |
| 346,062 | 7/1886 | Oatman | 99—116 |
| 1,578,820 | 3/1926 | Gere | 99—116 |
| 2,485,637 | 10/1949 | Gooding et al. | 99—116 |
| 2,956,885 | 10/1960 | Roundy et al. | 99—116 |
| 3,025,165 | 3/1962 | Metzer | 99—118 |
| 3,082,228 | 3/1963 | Sutherland | 260—420 |

FOREIGN PATENTS 852,908 12/1960 Great Britain.

OTHER REFERENCES

Green et al., Journal American Medical Association, vol. 183, No. 1, Jan. 5, 1963, pp. 5–12.

A. LOUIS MONACELL, *Primary Examiner.*

DAREN M. STEPHENS, *Assistant Examiner.*